(12) United States Patent
Hillion et al.

(10) Patent No.: US 6,492,430 B1
(45) Date of Patent: Dec. 10, 2002

(54) METHODS OF MAKING EMULSIFYING AND DISPERSING SURFACTANTS AND THEIR USE

(75) Inventors: Gérard Hillion, Herblay (FR); Isabelle Durand, Rueil Malmaison (FR); Anne Sinquin, Nanterre (FR); Marie Velly, Montesson (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/573,558

(22) Filed: May 19, 2000

(30) Foreign Application Priority Data

May 19, 1999 (FR) .............................. 99 06446

(51) Int. Cl.[7] .............................. B01F 3/04; B01F 3/08; B01F 17/34; C07C 9/00
(52) U.S. Cl. .............................. 516/15; 516/27; 516/31; 516/33; 516/67; 516/69; 516/914; 516/915; 554/25; 554/26; 554/66; 585/15; 507/90
(58) Field of Search .............................. 516/15, 27, 31, 516/33, 69, 915, 67, 914; 554/25, 26, 66; 44/389, 391, 408, 409; 508/454, 455, 456; 585/15; 507/90

(56) References Cited

U.S. PATENT DOCUMENTS 2,228,988 A * 1/1941 DeGroote et al. .......... 516/203
5,958,844 A * 9/1999 Sinquin et al. ............ 585/15
6,221,920 B1 * 4/2001 Hillion et al. ............. 516/15

FOREIGN PATENT DOCUMENTS

EP 905 350 A1 * 3/1999
FR 2 768 732 3/1999

OTHER PUBLICATIONS

HAwley's Condensed Chemical Dictionary, 11 th Edition, (Van Nostrand Reinhold Co., Ny, NY copyright 1987) pp. 444 and 728. (Oct. 1989).*

* cited by examiner

Primary Examiner—Daniel S. Metzmaier
(74) Attorney, Agent, or Firm—Millen, White, Zelano & Branigan, P.C.

(57) ABSTRACT

A process for preparing a composition comprising a mixture with ester and amine function in the form of ester-amines, amines, salts of amines, monoglycerides and diglycerides all derived from monomeric, dimeric, trimeric, and/or tetrameric fatty acids contained in polymerized polyunsaturated oil comprising: (a) polymerizing a polyunsaturated vegetable or animal oil to form a polymerized oil, (b) treating the polymerized oil with water vapor, and (c) reacting the polymerized oil with an excess of at least one compound containing at least one hydroxyl function and at least one tertiary amine function, optionally in the presence of a catalyst. Said methods further comprise adding the compositions to an oil effluent as dispersing agents for hydrates.

16 Claims, No Drawings

METHODS OF MAKING EMULSIFYING AND DISPERSING SURFACTANTS AND THEIR USE

FIELD OF THE INVENTION

The invention relates to compositions that can be used as emulsifying and dispersing surfactants, and more particularly as additives for dispersing hydrates in oil effluents, and their preparation.

DESCRIPTION OF THE PRIOR ART

In U.S. Pat. No. 6,221,920, the Assignee described a process for the production of a composition consisting of a mixture containing at least amides, amines, ester-amides, ester-amines, salts of amines and mono-glycerides, formed from the monomeric, dimeric trimeric and/or tetrameric fatty acids contained in a polymerized polyunsaturated oil, this process comprising the transamdification and transesterification reaction of a thermally polymerized polyunsaturated oil, with at least one aminoalcohol, used in excess. In order that the final composition contains esteramide compounds, it was necessary to use aminoalcohols of which at least one amine function is primary or secondary. The aminoalcohols which are capable of being used were therefore, for example, monoethanolamine, monopropanolamine, monoisopropanolamine, 1-aminobutanol, 2-amino-1-butanol, N-methylethanolamine, N-butylethanolamine, pentanolamine, hexanolamine, cyclohexanolamine, polyalcoholamines or also polyalkoxyglycolamines, as well as aminated polyols such as diethanolamine, diisopropanolamine or trihydroxymethylaminomethane. Diethanolamine was preferably used.

The composition obtained could be used, without any purification, as an emulsifying and dispersing surfactant, as such or after dilution with various solvents, such as, for example, aromatic fractions, various alcohols or also with certain fatty acid esters.

It was indicated that the compositions thus defined were able to be used in a large number of applications, for example, as emulsifying agents allowing the formation of oil-in-water or water-in-oil emulsions, depending on the nature of the oil and the respective proportions of the two constituents (the hydrophilic constituent and the hydrophobic constituent). They could also be used as dispersing agents for solids or as foam stabilizers in a liquid or in an emulsion. A particular use which was indicated consisted of forming stable dispersions of ice in hydrocarbon media, for example, in light condensates of oil.

U.S. Pat. No. 5,958,844 describes another particular application of the compositions prepared according to the process of U.S. Pat. No. 6,221,920. This application consists of using them as dispersing additives for hydrates in suspension in fluids containing at least water, a gas and a liquid hydrocarbon (under conditions where hydrates may form from the water and gas), in a manner so as to facilitate transport of same.

It has now been realized that the effectiveness as dispersing additives for hydrates, of the compositions prepared as described in U.S. Pat. 6,221,920 varied according to the type of oil effluent considered and that, although it is excellent in certain effluents it can be less good in others.

SUMMARY OF THE INVENTION

Other compositions have now been found which can be advantageously used as emulsifying and dispersing surfactants and which have, as dispersing additives for hydrates, an improved effectiveness in certain oil effluents, in which the compositions prepared as described in U.S. Pat. No. 6,221,290 might be less effective.

Such compositions can be prepared by using aminoalcohols having at least one tertiary amine function instead of aminoalcohols having primary or secondary functions. These compositions do not include ester-amides.

DETAILED DESCRIPTION OF THE INVENTION

The compositions according to the invention therefore contain at least compounds with ester and amine functions in the form of ester-amines, as well as the salts of amines, monoglycerides and diglycerides, these compounds being formed from monomeric, dimeric, trimeric and/or tetrameric fatty acids contained in a polymerized polyunsaturated, natural, vegetable or animal oil.

They can be obtained by a process which comprises the following stages:

a) use (or preparation) of a polymerized oil by polymerization of a polyunsaturated vegetable or animal oil;

b) optionally, treatment of said polymerized oil by entrainment with water vapor; and c) reaction of the polymerized oil with an excess of at least one compound containing at least one hydroxyl function and at least one tertiary amine function, in the presence or not of a catalyst.

In order to prepare the compositions according to the invention, a commercial polymerized polyunsaturated oil can be used, such as the products known under the names "standolie", "stand oils" or "bodied oils". In this case, stage (c) of the process is carried out directly, optionally preceded by a stage such as (b).

In a different manner, if in stage (a) one has to prepare the polymerized oil, one can start from any vegetable or animal oil having a degree of polyunsaturation sufficient to allow the polymerization by contact of the fatty chains containing diene or triene between themselves, as is the case, for example, for linoleic and linolenic acid. As examples the following oils can be mentioned: linseed, sunflower, safflower, china wood, grapeseed, soybean or corn, or certain fish oils, as well as any other oils having high levels of linoleic and/or linolenic acid.

Linseed oil is preferred in the invention. An approximate composition in fatty acids of linseed oil is as follows:

| | |
|---|---|
| palmitic acid: | 5.5% by weight |
| stearic acid: | 3.5% by weight |
| oleic acid: | 19.0% by weight |
| linoleic acid: | 14.4% by weight |
| linolenic acid: | 57.6% by weight |

The polymerization of a polyunsaturated oil can be carried out according to any appropriate method, thermally or by catalytic route. The polymerization by essentially thermal route can be carried out by simple heating to approximately 300° C. under nitrogen. The heating time then determines a viscosity gradient of the polymerized oil, which can reach, after a heating time for example of 20 hours or more, a dynamic viscosity of 65 Pa·s at 20° C.

The polymerization can also be carried out at 280–290° C. under reduced pressure in the presence of anthraquinone or benzoquinone (see Nisshin Oils Mills, Yokohama, Japan, Nagakura and coll. (1975), 48(4), 217–22).

When the polymerized polyunsaturated oil used to produce the compositions according to the invention is prepared, in order to reduce the duration of the polymerization and therefore the risk of forming undesirable degradation products, provision can also be made to catalyze the polymerization of the starting polyunsaturated oil by metals, such as for example, zinc, lead, tin or copper in the form of nitrates, chlorides or stearates, or also manganese in the form of oxide or of a salt. In this respect, there can be mentioned for example the heating for 6 hours of the linseed oil with copper (II) nitrate in a proportion of 0.5 to 2% by weight relative to the starting oil described by Sil S. and Koley S. N., Department of Chemical Technology, Univ. of Calcutta (1987) 37(8), 15–22.

Among the metal catalysts used to reduce the duration of the reaction, a salt or dioxide of manganese $MnO_2$ can be advantageously used, for example in a proportion of 0.5 to 2% by weight relative to the starting oil. Such catalysts can in fact be left in the final product without causing problems of toxicity or compatibility with the media in which the additive will be finally used.

In all cases, in order to be able to be used in the production process according to the invention, the polymerized oils advantageously have a dynamic viscosity at 20° C. of 5 to 65 Pa·s and preferably of 10 to 20 Pa·s. They generally have an acid number of 8 to 20.

The composition of the oligomers of fatty acids contained in a polymerized linseed oil having a dynamic viscosity at 20° C. of 65 Pa·s is given hereafter, by way of example:

| | |
|---|---|
| monomeric fatty acids: | 44.10% by weight |
| dimeric fatty acids: | 32.30% by weight |
| trimeric fatty acids: | 14.50% by weight |
| higher oligomers | 9.10% by weight. |

These values were obtained after methanolysis of the polymerized oil, and the separation of the methyl esters of the different fatty acids (monomers, dimers, trimers and higher oligomers) was achieved by gel-permeation chromatography (GPC). The acid number of the polymerized oil is equal to 16 mg of KOH/g.

The product of the polymerization reaction, after methanolysis, can be purified by distillation in order to eliminate from it the esters fraction corresponding to the monomeric fatty acids. A mixture is then obtained which contains approximately 1% of monomeric acids, approximately 75% of dimeric acids, approximately 19% of trimeric acids and approximately 5% of higher oligomers.

Moreover, it was noticed that it was possible to improve the properties of the compositions according to the invention by subjecting the polymerized oil, in an optional stage (b) which is carried out before the reaction with the aminoalcohol, to an operation of entraining with dry water vapor having the effect of deodorizing the polymerized oil and eliminating degradation products which could be present in the polymerized oils and pose problems vis-a-vis certain media in which the final compositions may be used.

In order to carry out this treatment, a stream of dry water vapor is passed over the polymerized oil to be treated, in a quantity of 5 to 30% by weight relative to the oil for example, at a temperature of 180 to 250° C., under a vacuum of 7 to 2.5 kPa and for a period of 1 to 5 hours.

Stage (c) of the preparation process for the compositions according to the invention implements the reaction of the polymerized oil, optionally after treatment by entraining with water vapor, with an excess of at least one aminoalcohol containing at least one hydroxyl function and at least one tertiary amine function. Triethanolamine, for example can be used as the aminoalcohol.

This reaction can be carried out at a temperature of 100 to 200° C. and preferably 110 to 160° C., preferably without catalyst with elimination of the water vapor as it forms, either by using a third solvent in order to obtain an azeotrope, or by operating without solvent, but by elimination of the water by distillation under reduced pressure (see for example U.S. Pat. No. 2,089,212 and the article by Harry Kroll and Herbert Nadeau in J.A.O.C.S. 34, 323–326, June 1957). The reaction can also be catalyzed, which appreciably reduces its duration. As catalysts, alkaline alcoholates of lithium, sodium or potassium methylate or ethylate type are generally used. The reaction time is then 15 to 200 minutes; preferably, the reaction is stopped after 100 minutes.

The molar ratio of the aminoalcohol to the polymerized oil, expressed as the moles of fatty acids which it contains, is generally from 1/1 to 2/1, preferably, of the order of 1.5/1.

The product obtained by the process according to the invention consists of a composition mainly containing compounds with ester and amine functions, in particular in the form of ester-amines, as well as monoglycerides and diglycerides, formed from monomeric, dimeric, trimeric and/or tetrameric fatty acids, contained in the polymerized polyunsaturated oil. It can be used directly without any purification, either as such or after dilution in a solvent suitable for the emulsifying application chosen. The compatible solvents which may be used can be chosen from the aromatic solvents, such as for example toluene or xylenes, or the fractions of aromatic solvents, the esters of C1 to C8 monoalcohols and of the mixture of C6 to C22 fatty acids deriving from castor oil, the esters of C1 to C8 monoalcohols of hydroxylated C6 to C22 fatty acids obtained by chemical route and all esters produced by the opening of the epoxide bond of epoxidated mono-or polyunsaturated esters.

The compositions according to the invention are of particular use as dispersing additives for hydrates in oil effluents intended to reduce the tendency to agglomerate of said hydrates. In this use, these compositions are added to the fluid to be treated at concentrations ranging in general from 0.1 to 5% by weight, preferably 0.2 to 2% by weight relative to the water.

The entire disclosure of all applications, patents and publications, cited above and below, and of corresponding French application 99/06446, filed May 19, 1999 are hereby incorporated by reference.

The following examples illustrate the invention. Examples 1, 3 and 4 are given by way of comparison.

EXAMPLE 1

Comparative 325 g (0.37 mole, calculated as equivalents of triglycerides) of a polymerized linseed oil having a dynamic viscosity of 10 Pa·s at 20° C. is introduced under a nitrogen atmosphere with 175 g of diethanolamine (1.66 moles) into a one-liter flask provided with mechanical agitation and heated via an oil bath.

The composition by weight in fatty acids and oligomers of fatty acids of the starting polymerized linseed oil is as follows:

| | |
|---|---|
| monomeric fatty acids: | 48.8% |
| dimeric fatty acids: | 32.4% |
| trimeric fatty acids: | 13.0% |
| higher oligomers: | 5.8%. |

Its acid number is equal to 10.

The mixture is heated to 160° C. A methanolic solution of sodium methylate at 30% by weight is introduced. After reacting at 160° C. for 15 to 20 minutes, the product becomes homogeneous and limpid. This temperature of 160° C. is maintained for 100 minutes before the mixture is cooled down.

The product is diluted in the reaction flask by introducing 500 g of a methyl ester of castor oil.

The mixture thus obtained is a yellow liquid with a density at 25° C. of 0.950, a viscosity at 20° C. of 212 mPa·s, a flash point greater than 60° C. and a pour point lower than 20° C.

EXAMPLE 2

325 g of the same polymerized linseed oil as used in Example 1 is introduced under a nitrogen atmosphere with 247 g of triethanolamine (1.66 moles) into a one-liter flask provided with mechanical agitation and heated via an oil bath.

The mixture is heated to 160° C. A methanolic solution of sodium methylate at 30% by weight is introduced. After reacting at 160° C. for 15 to 20 minutes, the product becomes homogeneous and limpid. This temperature of 160° C. is maintained for 100 minutes before the mixture is cooled down.

The product is diluted in the reaction flask by introducing 572 g of a methyl ester of castor oil.

The mixture obtained has a density at 25° C. of 0.955, a dynamic viscosity at 20° C. of 237 mPa·s, a flash point greater than 60° C. and a pour point lower than 20° C.

In the following examples, the effectiveness, as additives for dispersing the hydrates in an oil effluent, of the products prepared as described in Examples 1 and 2 is tested. The transport of fluids forming hydrates, such as oil effluents, is simulated and tests are carried out on the formation of hydrates from gas, condensate and water, using the apparatus described below.

The apparatus comprises a 10-meter loop constituted by tubes with an internal diameter equal to 7.7 mm; a 2-liter reactor containing an inlet and outlet for the gas, an intake pipe and discharge pipe for the mixture: condensate, water and additive initially introduced. The reactor allows the loop to be pressurized.

Tubes of a similar diameter to those of the loop ensure the circulation of the fluids from the loop to the reactor, and vice versa, by means of a gear pump placed between the two. A sapphire cell integrated in the circuit allows visualization of the liquid in circulation, and therefore the hydrates, if they are formed.

In order to determine the effectiveness of the additives according to the invention, the fluids (water, oil, additive) are introduced into the reactor; the installation is then pressurized to 70 bar. Homogenization of the liquids is ensured by their circulation in the loop and the reactor, then solely in the loop. While monitoring the variations in the loss of head and flow rate, a rapid lowering of the temperature is imposed, from 17° C. to 4° C. (temperature lower than the formation temperature of the hydrates), this is then maintained at this value.

The duration of the tests can vary from a few minutes to several hours: a high performance additive allows the circulation of the suspension of hydrates to be maintained with stable loss of head and flow rate.

EXAMPLE 3

Comparative

In this example, the operation is carried out with a fluid composed 10% by volume of water and a crude oil.

The composition by weight of the crude oil is as follows:

for the molecules having less than 20 carbon atoms: 47% saturated hydrocarbons and 14% aromatics; and for the molecules having at least 20 carbon atoms: 39% of a mixture of saturated hydrocarbons, aromatics, resins and asphaltenes.

The gas used contains 98% methane and 2% ethane by volume. The experiment is carried out under a pressure of 7 MPa, which is held constant by a supply of gas. Under these conditions, the formation of a plug is observed in the coil a few minutes after the formation of hydrates starts (at a temperature of approximately 10.8° C.); the hydrates form a blockage and circulation of the fluid becomes impossible.

EXAMPLE 4

Comparative

In this example, the operation is carried out as in comparative Example 3 with the same fluid, the same gas and at the same pressure, however, 1% by weight relative to the water of the product produced in Example 1 is added to the fluid in circulation. Under these conditions an increase in the loss of head is observed when the formation of the hydrates occurs (at a temperature of approximately 10° C.), followed by its reduction and its stabilization for more than 12 hours at a temperature of 4° C.

EXAMPLE 5

In this example, the operation is carried out as in comparative Example 3 with the same fluid, the same gas and at the same pressure, however, 1% by weight relative to the water of the product produced in Example 2 is added to the fluid in circulation. Under these conditions an increase in the loss of head is observed when the formation of the hydrates occurs (at a temperature of approximately 10° C.), followed by its reduction and its stabilization for more than 24 hours at a temperature of 4° C.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a composition comprising a mixture with ester and amine functions in the form of ester-amines, amines, salts of amines, monoglycerides, and diglycerides all derived from- monomeric, dimeric, trimeric, and/or tetrameric fatty acids contained in a polymerized polyunsaturated, natural, vegetable or animal oil and wherein at least one of said amine functions is a tertiary amine, comprising:

(a) polymerizing a polyunsaturated vegetable or animal oil to form a polymerized oil, (b) treating said polymerized oil by entrainment with water vapor by passing a stream of dry water vapor over the polymerized oil, in a quantity of 5 to 30% by weight relative to the oil, at 180 to 250° C., under a vacuum of 7 to 2.5 kPa and for a period of 1 to 5 hours, and (c) reacting said polymerized oil with an excess of at least one compound containing at least one hydroxyl function and at least one tertiary amine function, optionally in the presence of a catalyst.

2. The process according to claim 1, wherein the polymerized oil has a high level of polyunsaturated acids and has a dynamic viscosity of 5 to 65 Pa·s at 20° C.

3. The process according to claim 1, wherein the polyunsaturated vegetable or animal oil is polymerized thermally.

4. The process according to claim 1, wherein said polyunsaturated vegetable or animal oil in step (a) is polymerized by a catalyst.

5. The process according to claim 4, wherein said catalyst is manganese dioxide.

6. The process according to claim 1, wherein said polyunsaturated vegetable oil is linseed oil.

7. The process according to claim 1, wherein in step (c) the molar ratio of the compound containing at least one hydroxyl function and at least one tertiary amine function to the polymerized oil, expressed as the moles of fatty acids, is from 1/1 to 2/1.

8. The process according to claim 1, wherein said compound containing at least one hydroxyl function and at least one tertiary amine function is an aminoalcohol.

9. The process according to claim 1, wherein the compound containing at least one hydroxyl function and at least one tertiary amine function used in step (c) is triethanolamine.

10. The process according to claim 1 wherein the reaction product of step (c) is diluted in a solvent.

11. The process according to claim 10, wherein said solvent is selected from the group consisting of: an aromatic solvent, a fraction of an aromatic solvent, an ester of a $C_1$ to $C_8$ monoalcohol, a $C_6$ to $C_{22}$ fatty acid derived from a castor oil, an ester of a $C_1$ to $C_8$ monoalcohol of a hydroxylated $C_6$ to $C_{22}$ fatty acid obtained by a chemical route, and an ester produced by the opening of the epoxide bond of an epoxidated mono- or polyunsaturated ester.

12. The process according to claim 1, wherein at step (c) the reaction is completed after a heating time of 15 to 200 minutes.

13. The process according to claim 1, wherein at step (c) the reaction temperature is from 100 to 200° C.

14. A method for dispersing hydrates in an oil effluent comprising adding to said oil effluent a composition prepared according to the process of claim 1.

15. The method according to claim 14, wherein said composition is added to said oil effluent at a concentration ranging from 0.1 to 5% by weight relative to the water.

16. The method according to claim 12, wherein said composition is added to said oil effluent at a concentration ranging from 0.2 to 2% by weight relative to the water.

* * * * *

UNITED STATES PATENT AND TRADEMARK OFFICE
CERTIFICATE OF CORRECTION

PATENT NO. : 6,492,430 B1 Page 1 of 1
DATED : December 10, 2002
INVENTOR(S) : Gerard Hillion et al.

It is certified that error appears in the above-identified patent and that said Letters Patent is hereby corrected as shown below:

Column 7,
Line 18, reads "65 Pa's" should read -- 65 Pa.s --

Column 8,
Line 29, reads "according to claim 12" should read -- according to claim 15 --

Signed and Sealed this

Eleventh Day of May, 2004

JON W. DUDAS
*Acting Director of the United States Patent and Trademark Office*